(12) United States Patent
Coldren

(10) Patent No.: US 9,562,497 B2
(45) Date of Patent: Feb. 7, 2017

(54) ENGINE SYSTEM HAVING PIEZO ACTUATED GAS INJECTOR

(71) Applicant: Caterpillar Inc., Peoria, IL (US)

(72) Inventor: Dana Ray Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 308 days.

(21) Appl. No.: 14/308,139

(22) Filed: Jun. 18, 2014

(65) Prior Publication Data

US 2015/0369177 A1 Dec. 24, 2015

(51) Int. Cl.
*F02M 51/00* (2006.01)
*F02M 21/02* (2006.01)
*F02M 51/06* (2006.01)
*F02M 63/00* (2006.01)

(52) U.S. Cl.
CPC ..... *F02M 21/0275* (2013.01); *F02M 21/0254* (2013.01); *F02M 21/0257* (2013.01); *F02M 51/0603* (2013.01); *F02M 63/0026* (2013.01)

(58) Field of Classification Search
CPC ............ F02M 51/0603; F02M 51/0607; F02M 63/0026; F02M 63/0028
USPC ........................................ 123/472, 498, 527
See application file for complete search history.

(56) References Cited

U.S. PATENT DOCUMENTS

| | | | |
|---|---|---|---|
| 5,779,149 A * | 7/1998 | Hayes, Jr. ............ | F02M 47/027 239/124 |
| 6,142,443 A * | 11/2000 | Potschin .............. | F02M 47/027 123/472 |
| 6,298,829 B1 | 10/2001 | Welch et al. | |
| 6,499,464 B2 | 12/2002 | Rueger | |
| 6,499,471 B2 | 12/2002 | Shen et al. | |
| 6,655,602 B2 | 12/2003 | Shafer et al. | |
| 7,527,041 B2 * | 5/2009 | Wing ................. | F02M 51/0603 123/478 |
| 7,850,091 B2 * | 12/2010 | Boecking ........... | F02M 51/0603 123/472 |
| 2001/0032612 A1 * | 10/2001 | Welch ................ | F02M 21/0254 123/294 |
| 2005/0145713 A1 * | 7/2005 | Reiter ................ | F02M 51/0607 239/88 |
| 2006/0214021 A1 | 9/2006 | Boecking | |
| 2007/0246019 A1 * | 10/2007 | Stoecklein ......... | F02M 51/0603 123/472 |
| 2014/0021387 A1 | 1/2014 | Schmieder et al. | |

FOREIGN PATENT DOCUMENTS

| | | |
|---|---|---|
| DE | 102006001377 | 7/2007 |
| WO | WO 2009071392 | 6/2009 |
| WO | WO 2014012795 | 1/2014 |

* cited by examiner

*Primary Examiner* — Erick Solis
(74) *Attorney, Agent, or Firm* — Finnegan, Henderson, Farabow, Garrett & Dunner, LLP

(57) ABSTRACT

A fuel injector is disclosed for use in an engine system. The fuel injector may have a body, a first piston slidingly disposed in the body and having a first pressure area, and a second piston slidingly disposed in the body and having a second pressure area. The fuel injector may also have a hydraulic coupling connecting the first and second pressure areas, and a piezo stack connected to move the first piston. The fuel injector may additionally have a valve needle configured to engage and be moved by the second piston. The first pressure area may be larger than the second pressure area.

20 Claims, 2 Drawing Sheets

US 9,562,497 B2

ENGINE SYSTEM HAVING PIEZO ACTUATED GAS INJECTOR

TECHNICAL FIELD

The present disclosure relates generally to an engine system and, more particularly, to an engine system having a piezo actuated gas injector.

BACKGROUND

Gaseous fuel powered engines are common in many applications. For example, the engine of a locomotive can be powered by natural gas (or another gaseous fuel) alone or by a mixture of natural gas and diesel fuel. Natural gas may be more abundant and, therefore, less expensive than diesel fuel. In addition, natural gas may burn cleaner in some applications.

Natural gas has traditionally been introduced into an engine's cylinders via a solenoid operated admission valve. Although effective in some applications, a solenoid operated admission valve may not have the speed and/or force required to open fast enough or against high boost pressures in other applications.

One attempt to improve gas injection is disclosed in W.O. Patent 2009/071392 of Patrick et al, that published on Jun. 11, 2009 ("the '392 patent"). Specifically, the '392 patent discloses a fuel injector having a piezo actuator connected to a first piston, and a second piston connected to a valve needle. The first and second pistons are separated by a hydraulic coupling (i.e., a space) that is filled with fuel, and both pistons are surrounded by fuel. The piezo actuator is selectively energized to move the first piston toward the second piston, thereby causing movement of the needle valve. When the needle valve is pushed downward against a valve seat, filet injection is blocked. When the needle valve is pulled upward away from the valve seat, fuel injection is initiated.

Although the fuel injector of the '392 patent may be responsive, it may still be less than optimal. In particular, it may still lack sufficient movement and/or force for some applications. In addition, the injector may lack broad applicability to different types of fuel system, for example to gaseous fuel systems where the fuel is compressible and cannot be used within a hydraulic coupling. Further, while closing of the needle valve to end injections may be responsive during expansion of the piezo actuator, opening of the needle valve may be somewhat slower and/or unpredictable during retraction of the piezo actuator, without any other means of opening the valve. Finally, because of the inward valve opening design of the '392 patent, it may be possible for the needle valve to be inadvertently opened by high pressures in an associated combustion chamber, thereby causing interruption and/or instability in the ensuing combustion event.

The engine system of the present disclosure solves one or more of the problems set forth above and/or other problems in the art.

SUMMARY

In one aspect, the present disclosure is directed to a fuel injector. The fuel injector may include a body, a first piston slidingly disposed in the body and having a first pressure area, and a second piston slidingly disposed in the body and having a second pressure area. The fuel injector may also have a hydraulic coupling connecting the first and second pressure areas, and a piezo stack connected to move the first piston. The fuel injector may additionally have a valve needle configured to engage and be moved by the second piston. The first pressure area may be larger than the second pressure area.

In another aspect, the present disclosure is directed to another fuel injector. This fuel injector may include a body, a first piston slidingly disposed in the body and having a first pressure area, and a second piston slidingly disposed in the body and having a second pressure area about ten times the first pressure area. The fuel injector may also include a hydraulic coupling connecting the first and second pressure areas, and a piezo stack connected to move the first piston. The fuel injector may further include a nozzle connected to the body and forming a pressure chamber configured to receive gaseous fuel, and an outwardly opening valve needle slidingly disposed in the nozzle and configured to be moved by the second piston.

In yet another aspect, the present disclosure is directed to an engine system. The engine system may include an engine block at least partially defining a plurality of cylinders, and a plurality of pistons each disposed within one of the plurality of cylinders. The engine system may also include a plurality of cylinder heads each configured to engage the engine block and close off one or more of the plurality of cylinders to form a plurality of combustion chambers. The engine system may further include a gas injector disposed within each of the plurality of cylinder heads. The gas injector may include a body, a first piston slidingly disposed in the body and having a first pressure area, and a second piston slidingly disposed in the body and having a second pressure area larger than the first pressure area. The gas injector may also include a hydraulic coupling connecting the first and second pressure areas, a piezo stack connected to move the first piston, and a valve needle configured to engage and be moved by the second piston. The engine system may further include a supply of gaseous fuel in communication with the valve needle of each gas injector, and a single oil pump configured to supply pressurized oil to the hydraulic coupling of each gas injector.

DETAILED DESCRIPTION

Figure 1:
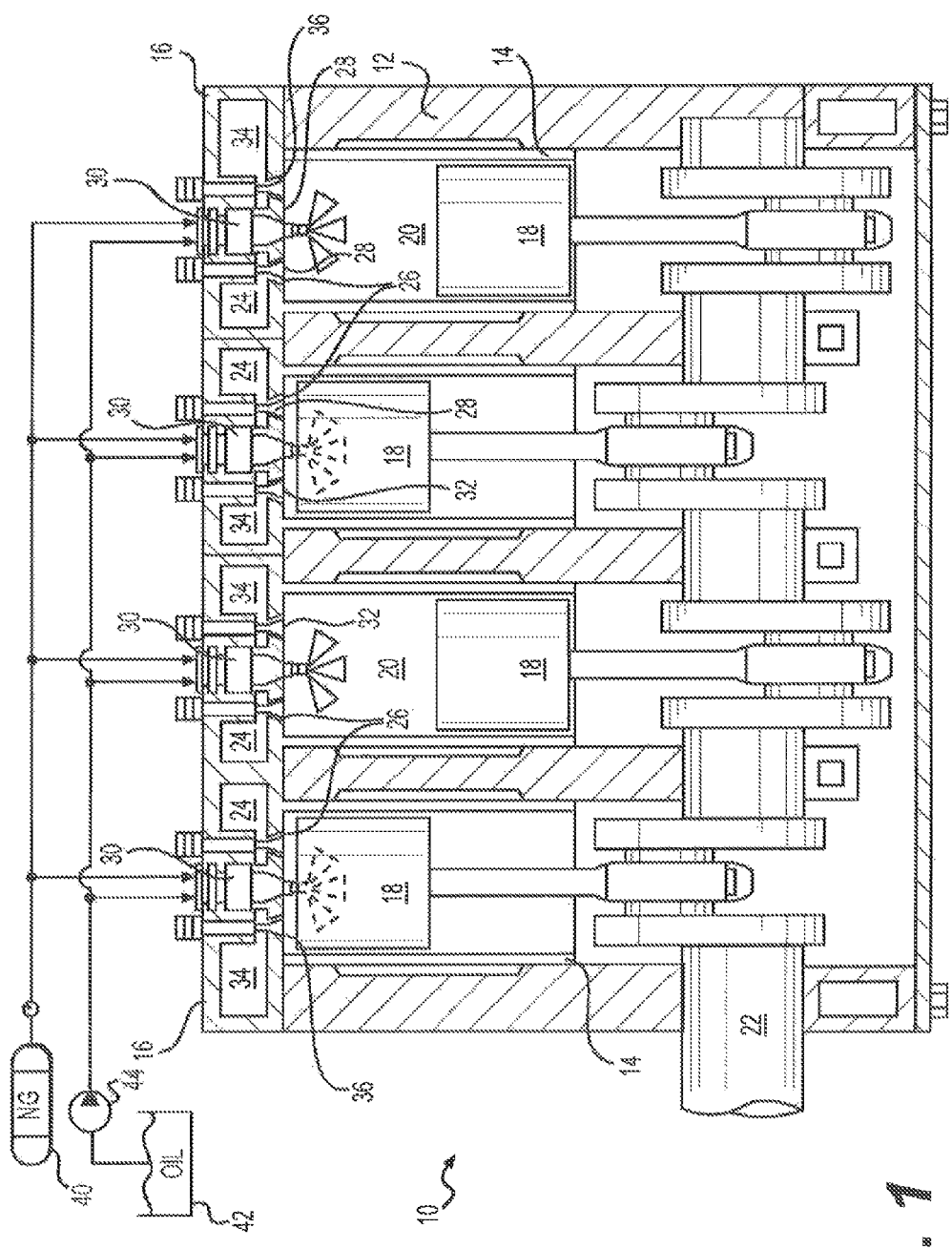
FIG. 1 is a cross-sectional illustration of an exemplary disclosed engine system.

FIG. 1 illustrates an exemplary engine system 10. Although engine system 10 is shown and described below as embodying a four-stroke gaseous fuel powered engine, it is contemplated that engine system 10 may be another type of engine (e.g., a four-stroke dual fuel engine or a two-stroke dual fuel or gaseous fueled engine), if desired. Engine system 10 may include, among other things, an engine block 12 defining a plurality of cylinders 14. A cylinder head 16 may be connected to engine block 12 to close off an end of each cylinder 14, and a piston 18 may be slidably disposed within cylinder 14. Piston 18, together with cylinder 14 and cylinder head 16, may define a combustion chamber 20. It is contemplated that engine system 10 may include any number of combustion chambers 20 and that combustion chambers 20 may be disposed in an "in-line" configuration, in a "V" configuration, in an opposing-piston configuration, or in any other suitable configuration.

Piston 18 may be configured to reciprocate within cylinder 14 between a top-dead-center position (TDC) and a bottom-dead-center position (BDC). In particular, piston 18 may be pivotally connected to a crankshaft 22, which is rotatably disposed within engine block 12. In this configuration, a sliding motion of each piston 18 within a corresponding cylinder 14 may result in a rotation of crankshaft 22. Similarly, a rotation of crankshaft 22 may result in the sliding motion of piston 18. As crankshaft 22 rotates through about 720 degrees, each piston 18 may move through four different strokes. Specifically, engine system 10 (as a four stroke engine) may undergo a complete combustion cycle that includes an intake stroke (TDC to BDC), a compression stroke (BDC to TDC), a power stroke (TDC to BDC), and an exhaust stroke (BDC to TDC).

During the intake stroke, air may be drawn and/or forced into combustion chamber 20 from an intake manifold 24 via one or more intake ports 26 located within cylinder head 16, in particular, as piston 18 moves downward within cylinder 14 toward BDC, one or more gas exchange valves (e.g., intake valves) 28 associated with intake ports 26 may be caused to move and open intake ports 26. When intake ports 26 are open and a pressure of air within intake manifold 24 is greater than a pressure within combustion chamber 20, air should pass through intake ports 26 into combustion chamber 20.

Gaseous fuel (e.g., natural gas) may be mixed with the air before, during, and/or after the air enters combustion chamber 20. In the disclosed embodiment, a gas injector 30 is mounted within each cylinder head 16 to provide axial injections of gaseous fuel. The gaseous fuel from injector 30 may mix with the air from intake ports 26 to form a fuel/air mixture within combustion chamber 20.

During the compression stroke, air may still be entering combustion chamber 20 via intake ports 26 as piston 18 starts its upward stroke to mix any residual gas with air and fuel in combustion chamber 20. Eventually, intake ports 26 may be blocked by motion of intake valves 28, and further upward motion of piston 18 may then compress the mixture. As the mixture within combustion chamber 20 is compressed, the mixture will increase in pressure and temperature. At some point during the compression stroke, the mixture will be ignited, causing rapid combustion and a release of chemical energy. This may result in a further and significant increase in the pressure and temperature within combustion chamber 20. In some embodiments (e.g., in a gas only embodiment), the mixture may be ignited by a spark plug or other ignition device. In a dual-fuel engine, an injection of liquid fuel (e.g., of diesel fuel) may be necessary to cause the mixture within combustion chamber 20 to ignite.

After piston 18 reaches TDC, the increased pressure caused by combustion may force piston 18 back downward, thereby imparting mechanical power to crankshaft 22 during the power stroke. Then during the ensuing exhaust stroke, one or more gas exchange valves (e.g., exhaust valves) 32 located within cylinder head 16 may open to allow pressurized exhaust within combustion chamber 20 to exit into an associated exhaust manifold 34 via corresponding exhaust ports 36. In particular, as piston 18 moves upward within cylinder liner 16, a position will eventually be reached at which exhaust valves 32 move to fluidly communicate combustion chamber 20 with exhaust manifold 34 by way of ports 36. When combustion chamber 20 is in fluid communication with exhaust manifold 34 and a pressure in combustion chamber 20 is greater than a pressure in exhaust manifold 34, exhaust should pass from combustion chamber 20 through exhaust ports 36 into exhaust manifold 34.

The gaseous fuel sprayed by injectors 30 into combustion chambers 20 may be provided from a supply 40. Supply 40 may embody, for example, a high-pressure cryogenic tank configured to hold liquid fuel (e.g., liquefied natural gas—LNG) at low temperatures. The liquid fuel may be vaporized prior to entering injectors 30. In some applications, a heater, accumulator, and/or pressure regulator may be used to vaporize, contain, and circulate the fuel.

In addition to gaseous fuel being directed to injectors 30, a supply 42 of pressurized actuating fluid (e.g., engine oil, diesel fuel oil, dedicated hydraulic oil, etc.) may also be directed to injectors 30. As will be described in more detail below, this fluid may be used to selectively open and/or close injectors 30, allowing a desired amount of gaseous fuel to be injected into combustion chambers 20 at a desired timing. A single pump 44 may be used to pressurize the actuating fluid for all injectors 30. In one embodiment, pump 44 is a separate pump dedicated to facilitating only fuel injection. In another embodiment, pump 44 may be used for additional purposes (e.g., to circulate engine oil throughout engine system 10 for lubrication and/or cooling purposes), if desired.

Figure 2:
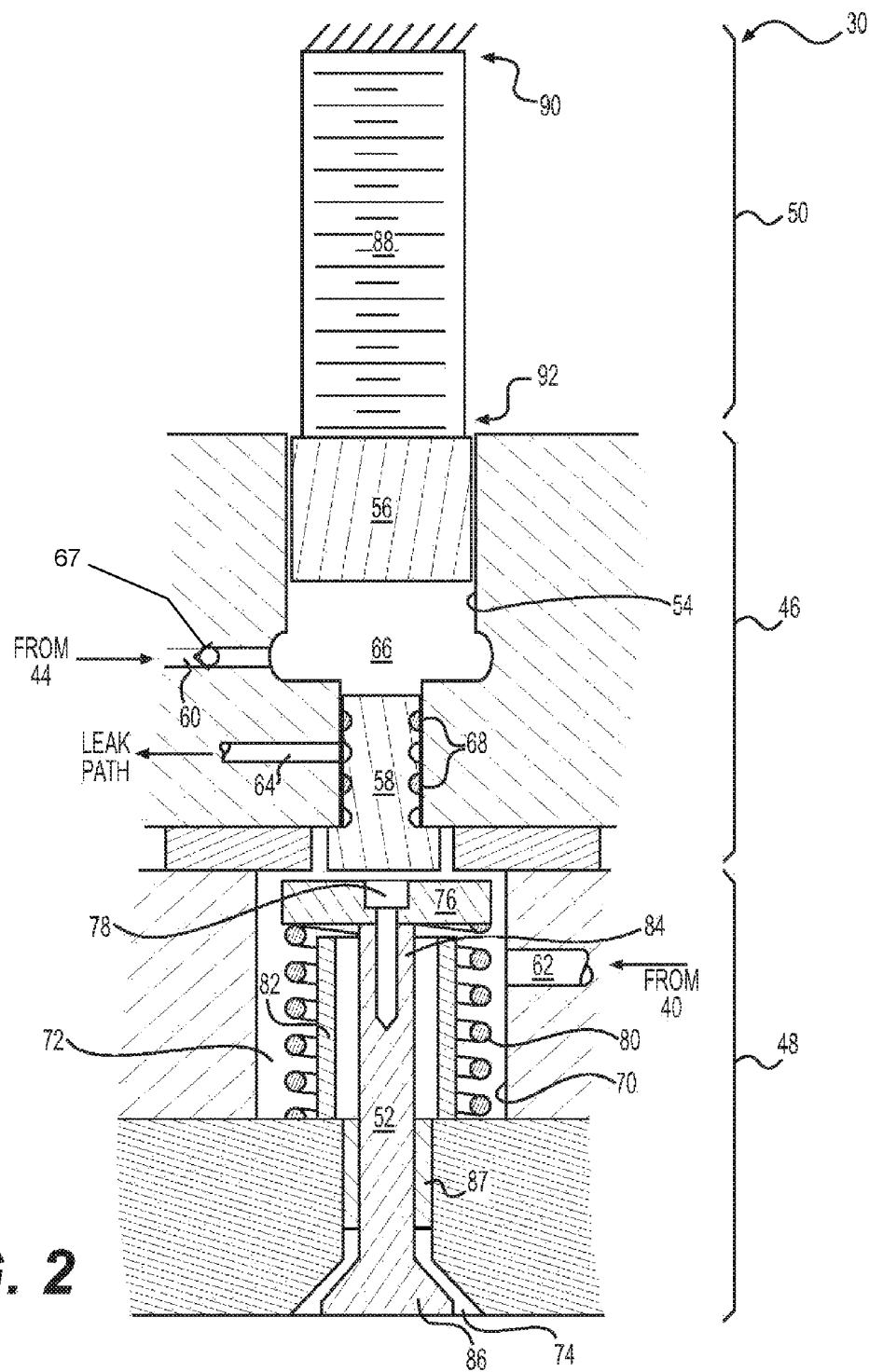
FIG. 2 is a cross-sectional illustration of an exemplary disclosed gas injector that may be used in conjunction with the engine system of FIG. 1.

An exemplary gas injector 30 is shown in FIG. 2. Injector 30 may include, among other things, a body 46, a nozzle 48 operably connected to body 46, an actuator 50 connected to body 46 at an end opposite nozzle 48, and a valve needle 52 slidingly disposed within nozzle 48. It is contemplated that additional components may be included within fuel injector 30 such as, for example, pressure-balancing passageways, accumulators, filters, and other injector components known in the art.

Injector body 46 may be a cylindrical member configured for mounting inside or outside of cylinder head 16, and include one or more passageways. In the disclosed embodiment, injector body 46 includes a central bore 54 configured to receive first and second pistons 56 and 58, an oil inlet 60, a gas inlet 62, and a return outlet 64. Oil inlet 60 may extend from a connection with pump 44 (referring to FIG. 1) radially inward to central bore 54 to fill bore 54 with oil (or another coupling fluid) used to hydraulically couple motion of actuator 50 to valve needle 52. In one embodiment, a check valve 67 may be disposed within inlet 60 to ensure unidirectional flow into bore 54. Gas inlet 62 may extend from a connection with supply 40 to an interface with nozzle 48. It is contemplated that additional, fewer, and/or different passages may be included within injector body 46, if desired.

Pistons 56 and 58 may each embody a cylindrical member received within central bore 54 of body 46, at an axial location between nozzle 48 and actuator 50. Piston 56 may be separated from piston 58 by an oil-filled space inside bore 54, thereby forming a hydraulic coupling 66. With this configuration, axial movement of piston 56 within body 46 may be hydraulically translated to a corresponding axial movement of piston 58 via coupling 66.

In the disclosed embodiment, one or more seals 68 (e.g., o-rings) may be disposed around an outer surface of piston 58 so as to help inhibit the oil of coupling 66 from mixing with gaseous fuel from nozzle 48. Return outlet 64 may function as a leak path and extend radially inward to an intermediate axial location at a periphery of piston 58, between seals 68. Outlet 64 may allow for any leaked oil and/or gaseous fuel to exit injector 30. In some embodiments, a filter (e.g., a coalescing filter) may be associated with outlet 64 to separate the oil from the gaseous fuel. The oil may then be sent back to its source (e.g., back to a sump of engine system 10), while the gas may be recirculated to gas inlet 62.

It is contemplated that return outlet 64 may be omitted in some applications. In particular, during non-injecting events, a pressure of gaseous fuel acting on a lower surface of piston 58 may function to urge piston 58 upward into a sealing position against injector body 46. When piston 58 is at this position, the gaseous fuel may be inhibited from leaking upward past piston 58. And during an injection event, a pressure of the oil pushing piston 58 downward may be higher than a pressure of the gaseous fuel urging piston 58 upward. This pressure differential may function to also inhibit gaseous fuel from leaking upward past piston 58. Accordingly, there may be no need for return outlet 64 in some applications.

Piston 56 may have a substantially larger pressure area than piston 58. In the disclosed embodiment, the pressure area of piston 56 (i.e., the end face area oriented toward coupling 66) may be at least ten times larger than the pressure area of piston 58. This may allow for an axial displacement of piston 56 to cause an axial displacement of piston 58 that is at least ten times greater. In other words, a small axial translation of piston 56 may result in a large translation of piston 58. As pistons 56 and 58 are moved downward by actuator 50 toward nozzle 48, as will be described in more detail below, valve needle 52 may be pushed by piston 58 through nozzle 48 to a fuel injecting position. And when actuator 50 is de-energized, valve needle 52 may return to a closed or fuel blocking position. The return of valve needle 52 may also function to push piston 58 back to its initial positions.

Nozzle 48 may likewise embody a cylindrical member and have a central bore 70 configured to receive valve needle 52. A space between walls of a central bore 70 and valve needle 52 may form a pressure chamber 72 that holds a supply of pressurized gaseous fuel received from gas inlet 62 in anticipation of an injection event. Nozzle 48 may also include one or more orifices 74 that allow the pressurized gaseous fuel to flow from pressure chamber 72 into combustion chamber 20 of engine system 10 (referring to FIG. 1), as valve needle 52 is pushed downward through orifice 74.

The base end of valve needle 52 may reciprocate with bore 70 of nozzle 48, in general axial alignment with coupling 66. An end plate 76 may be rigidly connected to the base end of valve needle 52 (e.g., via a threaded fastener 78), and configured to engage an enlarged end of piston 58 located opposite coupling 66. End plate 76 (and thus valve needle 52) may be biased (e.g., via a spring 80) upward against the force of piston 58, such that piston 58 may require a minimum threshold force in order to move valve needle 52 through nozzle 48 and initiate gas injection. A motion limiter 82 may be disposed around valve needle 52 (e.g., inside spring 80) and configured to engage end plate 76, thereby limiting an amount that valve needle 52 is allowed to open.

Valve needle 52 may be an elongated cylindrical member that is slidingly disposed within nozzle 48. Valve needle 52 may be axially movable between a first position at which a tip end substantially blocks a flow of fuel through orifice 74, and a second position at which orifice 74 is open to allow a flow of fuel into combustion chamber 20. As can be seen in FIG. 2, valve needle 52 may include a base end 84, to which end plate 76 connects, and an opposing tip end 86 that selectively engages orifice 74 of nozzle 48. Although not shown, valve needle 52 could also include a guide 87 located proximate tip end 86.

Tip end 86 may have shape that trumpets or flares outward toward the distal end. In some embodiments, a face surface at the end may be flat (shown) or convex. With this configuration, the flare surface may function as an internal sealing surface configured to engage an annular shoulder, ridge, or knife edge of nozzle 48 at orifice 74. In other words, valve needle 52 may be an outward opening type of needle.

Actuator 50 may be disposed at an end of injector 30 that is opposite nozzle 48 to control the forces acting on valve needle 52. In particular, actuator 50 may include a piezo stack (i.e., stack of piezo electric crystals) 88 of a suitable shape and size across which an electric field may be applied to cause an axial deformation or extension thereof. A base end 90 of piezo stack 88 may be fixed, while a distal end 92 may be free to move when actuator 50 is energized and piezo stack 88 increases in length. In this manner, the extension of piezo stack 88 may cause movement of distal end 92. Distal end 92 may be fixedly connected to an end of piston 56, such that when piezo stack 88 increases in length, piston 56 (along with as piston 58, end plate 76, and valve needle 52) is forced downward toward nozzle 48 from a first or non-injecting position to a second or injecting position. When piezo stack 88 is de-energized, spring 80 may push valve needle 52, end plate 76, piston 58, and finally piston 56 back upward into the non-injecting position. In this manner, the timing and level of the induced current within piezo stack 88 may be controlled to affect injections of gaseous fuel.

INDUSTRIAL APPLICABILITY

The disclosed engine system may be used in any machine or power system application where it is beneficial to reduce emissions of harmful gases, while also delivering inexpensive power output. The disclosed engine system may provide a unique way to deliver gaseous fuel, which is known to produce lower levels of regulated exhaust constituents, to an engine cylinder. Operation of engine system 10 and injector 30 will now be explained in detail.

During normal operation of engine system 10, gaseous fuel may be supplied to each of injectors 30, from supply 40 (referring to FIG. 1). For example, liquefied natural gas may be vaporized, and directed through a regulator and/or other control mechanism to the gas inlet 62 of all injectors 30. In addition, an actuating fluid (e.g., engine oil, hydraulic fluid, diesel fuel, etc.) may be drawn from supply 42 by pump 44, pressurized, and directed to all oil inlets 60 of injectors 30. Injectors 30 may then be independently controlled to inject natural gas alone or a mixture of natural gas with another fuel (e.g., diesel fuel).

Referring to FIG. 2, actuator 50 may be selectively energized to initiate injections of natural gas into combustion chambers 20 by injectors 30. In particular, when an electrical current is applied to piezo stack 88, piezo stack 88 may elongate in an axial direction by a corresponding amount. This extension may push piston 56 toward piston 58, and coupling 66 may transmit this motion. As piston 58 moves downward, the force of the movement may be transmitted to end plate 76 and subsequently to valve needle 52, until the force overcomes the upward bias of spring 80. When this happens, valve needle 52 may be urged to move downward through orifice 74, thereby opening orifice 74 and initiating an injection event.

To end the injection event, actuator 50 may be de-energized to allow spring 80 to return valve needle 52, along with end plate 76 and piston 58, back toward actuator 50 until communication between pressure chamber 72 and orifice 74 is blocked. During the opening and closing movements of valve needle 52, if any oil leaks from coupling 67, the oil may be replenished via inlet 60 and check valve 67.

Because operation of injector 30 may rely on individual piezo stack operation, control may be simple and relatively inexpensive. In addition, the surface area ratio of piston 56 to piston 58 may provide for a desired amount of valve travel with a relatively short piezo stack. And each injector 30 may be separately controlled, thereby enhancing performance of engine system 10. Further, the use of a piezo stack to open valve needle 52 may result in highly responsive injection events, while the use of spring 80 to close valve needle 52 may result in a secure and quick closing event. Finally, the outward opening design of valve needle 52 may improve combustion chamber sealing, as high pressures in combustion chamber 20 may function to further seat valve needle 52 against orifice 74.

It will be apparent to those skilled in the art that various modifications and variations can be made to the disclosed engine systems without departing from the scope of the disclosure. Other embodiments of the engine systems will be apparent to those skilled in the art from consideration of the specification and practice of the engine systems disclosed herein. It is intended that the specification and examples be considered as exemplary only, with a true scope of the disclosure being indicated by the following claims and their equivalents.

What is claimed is:

1. A fuel injector, comprising:
a body defining a hydraulic coupling chamber and a fuel inlet passage therein;
a first piston slidingly disposed in the body and having a first pressure area;
a second piston slidingly disposed in the body and having
a second pressure area,
a bearing surface, and
a seal disposed between the second pressure area and the bearing surface,
the seal being in sliding engagement with the body, the first pressure area being fluidly coupled with the second pressure area via the hydraulic coupling chamber, the bearing surface being in fluid communication with the fuel inlet passage;
a piezo stack connected to the first piston to effect movement of the first piston relative to the body; and
a valve needle bearing on the bearing surface of the second piston, a gap between the valve needle and the body defining an outlet orifice that is configured to inject a fuel into a combustion chamber, the outlet orifice being in selective fluid communication with the fuel inlet passage based on relative motion between the valve needle and the body,
wherein the first pressure area is larger than the second pressure area.

2. The fuel injector of claim 1, wherein the valve needle is an outwardly opening valve needle.

3. The fuel injector of claim 2, further comprising a spring that biases the valve needle toward a closed position relative to the body.

4. The fuel injector of claim 3, further comprising a motion limiter disposed around the valve needle and configured to limit an opening amount of the valve needle.

5. The fuel injector of claim 4, wherein the motion limiter is located inside the spring.

6. The fuel injector of claim 4, wherein the valve needle includes an end plate disposed at an end of the valve needle, the bearing surface of the second piston engaging the end plate, the motion limiter being disposed to limit movement of the valve needle through engagement with the end plate.

7. The fuel injector of claim 1, wherein the body includes a nozzle defining a pressure chamber therein, and the valve needle is slidingly disposed in the pressure chamber.

8. The fuel injector of claim 7, wherein the pressure chamber is in fluid communication with the fuel inlet passage, and
wherein a pressure in the pressure chamber is sufficient between injection events to push the second piston against the body and thereby seal the pressure chamber from the hydraulic coupling.

9. The fuel injector of claim 7, wherein the body further defines a leak passage extending to an axial location of the second piston between the second pressure area and the bearing surface.

10. The fuel injector of claim 9, wherein the seal is a first seal, and the second piston further includes a second seal,
wherein the first seal is disposed around the second piston on a first side of the leak passage, and
wherein the second seal is disposed around the second piston on a second side of the leak passage, the second side of the leak passage being opposite the first side of the leak passage.

11. The fuel injector of claim 1, wherein the body further defines an oil inlet passage disposed in fluid communication with the hydraulic coupling chamber, and
wherein the fuel injector further comprises a check valve disposed in the oil inlet passage, the check valve being configured and arranged to allow flow only in a flow direction toward the hydraulic coupling chamber.

12. The fuel injector of claim 1, further including a guide associated with the valve needle and located proximate to a tip end of the valve needle.

13. The fuel injector of claim 1, wherein the first pressure area is about ten times the second pressure area so as to cause axial movement of the valve needle that is at least ten times an axial elongation of the piezo stack.

14. A fuel injector, comprising:
a body defining a hydraulic coupling chamber, a fuel inlet passage, and a pressure chamber therein;
a first piston slidingly disposed in the body and having a first pressure area;
a second piston slidingly disposed in the body and having
a second pressure area,
a bearing surface, and
a seal disposed between the second pressure area and the bearing surface, the seal being in sliding engagement with the body,
the first pressure area being fluidly coupled with the second pressure area via the hydraulic coupling chamber, the second pressure area being at least ten times the first pressure area,
the bearing surface being in fluid communication with the fuel inlet passage;
a piezo stack connected to the first piston to effect movement of the first piston relative to the body; and
a valve needle slidingly disposed in the pressure chamber and bearing on the bearing surface of the second piston, the pressure chamber being in fluid communication with the fuel inlet passage, a gap between the valve needle and the body defining an outlet orifice that is configured to inject a fuel into a combustion chamber, the outlet orifice being in selective fluid communication with the fuel inlet passage based on relative motion between the valve needle and the body, wherein an opening motion of the valve needle is outward of the body and away from the second piston.

15. The fuel injector of claim 14, further including comprising:
   a spring that biases the valve needle toward a closed position relative to the body; and
   a motion limiter disposed around the valve needle and inside the spring, and configured to limit an opening amount of the valve needle.

16. An engine system, comprising:
   an engine block at least partially defining a plurality of cylinders;
   a plurality of pistons, each piston of the plurality of pistons being disposed within one cylinder of the plurality of cylinders;
   a plurality of cylinder heads, each cylinder head of the plurality of cylinder heads being configured to engage the engine block and close off one or more cylinders of the plurality of cylinders to form a plurality of combustion chambers;
   a gas injector disposed within each cylinder head of the plurality of cylinder heads, the gas injector including:
      a body defining a hydraulic coupling chamber and a fuel inlet passage therein;
      a first piston slidingly disposed in the body and having a first pressure area;
      a second piston slidingly disposed in the body and having
         a second pressure area, a bearing surface, and a seal disposed between the second pressure area and the bearing surface, the seal being in sliding engagement with the body, the bearing surface being in fluid communication with the fuel inlet passage,
         the first pressure area being fluidly coupled with the second pressure area via the hydraulic coupling chamber, the second pressure area being larger than the first pressure area;
      a piezo stack connected to the first piston to effect movement of the first piston relative to the body; and
      a valve needle bearing on the bearing surface of the second piston, a gap between the valve needle and the body defining an outlet orifice that is configured to inject a fuel into a combustion chamber, the outlet orifice being in selective fluid communication with the fuel inlet passage based on relative motion between the valve needle and the body;
   a supply of gaseous fuel in communication with the valve needle of each gas injector via the fuel inlet passage of each gas injector; and
   a single oil pump configured to supply pressurized oil to the hydraulic coupling chamber of each gas injector.

17. The engine system of claim 16, wherein the valve needle of the gas injector is an outwardly opening valve needle.

18. The engine system of claim 16, wherein the gas injector further includes:
   a spring that biases the valve needle toward a closed position relative to the body; and
   a motion limiter disposed around the valve needle and inside the spring, and configured to limit an opening amount of the valve needle.

19. The engine system of claim 16, wherein the body further includes a nozzle that defines a pressure chamber therein, and
   wherein the valve needle is slidingly disposed in the pressure chamber.

20. The engine system of claim 19, wherein the fuel inlet passage is in fluid communication with the pressure chamber,
   the body further defines a leak passage extending to an intermediate axial location of the second piston, and an oil inlet passage, the single oil pump being in fluid communication with the hydraulic coupling chamber via the oil inlet passage,
   the seal is a first seal disposed around the second piston and located on a first side of the leak passage, and
   each gas injector further includes a second seal disposed around the second piston and located on a second side of the leak passage, the second side of the leak passage being opposite the first side of the leak passage.

* * * * *